(12) United States Patent
Rose et al.

(10) Patent No.: US 12,524,489 B1
(45) Date of Patent: *Jan. 13, 2026

(54) METHOD AND SYSTEM FOR INTELLIGENT NAVIGATION AND INTERFACE GENERATION SYSTEM

(71) Applicant: LIGHTRIVER TECHNOLOGIES, INC., Concord, CA (US)

(72) Inventors: Daniel W. Rose, Red Bank, NJ (US); James Michael Brinksma, Rutherford, NJ (US); Marcelo Alejandro McAndrew, Silver Spring, MD (US); Shivam Mehul Patel, Morganville, NJ (US); Alexander Xie, Newark, NJ (US); Kenneth L. Cinque, Lincroft, NJ (US); Timothy Alan Nice, Denver, CO (US); Timothy Wayne Masse, Spring Hill, TN (US)

(73) Assignee: LIGHTRIVER TECHNOLOGIES, INC., Concord, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/278,358

(22) Filed: Jul. 23, 2025

Related U.S. Application Data

(63) Continuation of application No. 19/244,898, filed on Jun. 20, 2025.

(51) Int. Cl.
*G06F 16/9538* (2019.01)
*G06F 16/955* (2019.01)
*H04L 51/02* (2022.01)

(52) U.S. Cl.
CPC ........ *G06F 16/9538* (2019.01); *G06F 16/955* (2019.01); *H04L 51/02* (2013.01)

(58) Field of Classification Search
CPC ..... G06F 16/9538; G06F 16/955; H04L 51/02
See application file for complete search history.

(56) References Cited

U.S. PATENT DOCUMENTS

| | | | |
|---|---|---|---|
| 2024/0281457 A1* | 8/2024 | de Witte | H04N 21/2187 |
| 2025/0117630 A1* | 4/2025 | Taheri | G06N 3/0895 |
| 2025/0166762 A1* | 5/2025 | Barkol | G16H 15/00 |
| 2025/0199829 A1* | 6/2025 | Bonatti | G06N 3/08 |

* cited by examiner

Primary Examiner — Cheyne D Ly
(74) Attorney, Agent, or Firm — Sterne, Kessler, Goldstein & Fox, P.L.L.C.

(57) ABSTRACT

This disclosure provides a method and system for an intelligent navigation and interface generation system (INS). This system receives a request to access data describing a communications network, via a first screen of a user interface. A prompt for instructing a large language model (LLM) to generate a structured view descriptor that specifies a second screen of a plurality of screens, of the user interface and a set of data to query for display in the second screen is constructed. The prompt is provided to the LLM to generate the structured view descriptor based on the prompt. The structured view descriptor is provided to the user interface to display a new version of the second screen responsive to the request.

20 Claims, 7 Drawing Sheets

```
 1  "reports": {
 2    "OMS": {
 3      "description": "The OMS Dashboard displays information about optical multiplex spans.The OMS dashboard shows information about capacity, location, and some handwa
 4      "tags": ["OMS", "span", "usage", "map", "service"],
 5      "components": ["OMSMap", "OMSOverview", "OMStable"],
 6      "filters": ["ne_type", "ne_tid_multiple", "used_percentage"]
 7    },
 8    "wavelength": {
 9      "description": "The Wavelength Dashboard displays information about wavelength services for managing wave division multiplexing.The Wavelength dashboard shows inf
10      "tags": ["wave", "wavelength", "service", "otu", "usage", "client", "carrier"],
11      "components": ["WavelengthOverview", "WavelengthTable"],
12      "filters": ["ne_type", "ne_tid_1", "ne_tid_2", "used_percentage"],
13    },
14    "ne-health": {
15      "description": "The NE Health Dashboard displays information about alarms.",
16      "tags": [
17        "health",
18        "alarm",
19        "critical",
20        "major",
21        "minor",
22        "cleaned",
23        "link",
24        "productive",
25        "asserted",
26        "down",
27        "trend"
28      ],
29      "components": ["AlarmTotal", "AlarmTopTen", "AlarmTrends"],
30      "filters": ["ne_tid", "ne_type", "interval"]
31    },
32    "device": {
33      "description": "The Device Dashboard displays information about optical networking network elements.The Device dashboard breaks down details about the properties
34      "tags": [
35        "device",
36        "node",
37        "NE",
38        "network element",
39        "model",
40        "mscuf actuner",
```

FIG. 3

METHOD AND SYSTEM FOR INTELLIGENT NAVIGATION AND INTERFACE GENERATION SYSTEM

CROSS-REFERENCE TO RELATED APPLICATION

This application is a continuation of U.S. application Ser. No. 19/244,898, filed Jun. 20, 2025, entitled "Method and System for Intelligent Navigation and Interface Generation System" which is incorporated herein by reference in its entirety.

FIELD OF INVENTION

The present disclosure relates generally to intelligently navigating a user interface and generating screens of the user interface.

BACKGROUND

Communication networks often including communication devices from multiple vendors and multiple generations of network technology. A communications network connecting two different cities may use different devices, across different vendors; and these devices may be serving many different clients. As an example of heterogeneous vendors, a communication network may have optical switches from Cisco Systems, Inc. of San Francisco, CA, and Juniper Networks, Inc. of Sunnyvale, CA. The network may span multiple generations of technology. In the example of optical networks, multiple generations may be both Optical Transport Network (OTN) and Synchronous Optical Network (SONET). In addition, various network devices can operate layers of the network, such as Open System Interconnect (OSI) network layers, including physical (e.g., optical), data link layer (e.g. Ethernet), and network (e.g., Internet Protocol).

A user interface can provide user access to various data and functionality of a communication network. For example, such a user interface can dynamically discover network inventory. It can use the collected data for automation of the network. It can collect data from network devices and analyze it to determine whether actions need to be taken. In this way, such a user interface system can enable network-on-demand and customer self-serve digital experiences.

However, the usefulness of the user interface often depends on how familiar a user is with the layout of the user interface, and how well-designed the user interface is for the particular user. Further, the usefulness of even a well-designed user interface may be reduced with newer users who are unfamiliar with where to find or access various data or functionality, or if the layout, functionality, data, or other visual aspects of the user interface are updated or changed. In these situations, the user would have to spend time and computing resources navigating and getting familiar with the user interface in order to locate the data and functionality the user needs.

BRIEF SUMMARY

According to one or more aspects an intelligent navigation and interface generation system is provided. This system receives a request to access data describing a communications network, via a first screen of a user interface. A prompt for instructing a large language model (LLM) to generate a structured view descriptor that specifies a second screen of the one or more screens, of the user interface and a set of data to query for display in the second screen is constructed. The prompt is provided to the LLM to generate the structured view descriptor based on the prompt. The structured view descriptor is provided to the user interface to display a new version of the second screen responsive to the request.

BRIEF DESCRIPTION OF THE DRAWINGS

The accompanying drawings are incorporated herein and form a part of the specification.

FIG. 3 illustrates an example of an interface map, according to some embodiments.

In the drawings, like reference numbers generally indicate identical or similar elements. Additionally, generally, the left-most digit(s) of a reference number identifies the drawing in which the reference number first appears.

DETAILED DESCRIPTION

A user interface can provide user access to various data and functionality of a computing system. However, the usefulness of the user interface often depends on how familiar a user is with the layout of the user interface, and how well-designed the user interface is for the particular user. Further, the usefulness of even a well-designed user interface may be reduced with newer users who are unfamiliar with where to find or access various data or functionality, or if the layout, functionality, data, or other visual aspects of the user interface are updated or changed. In these situations, the user would have to spend time and computing resources navigating and getting familiar with the user interface in order to locate the data and functionality the user needs.

Figure 1:
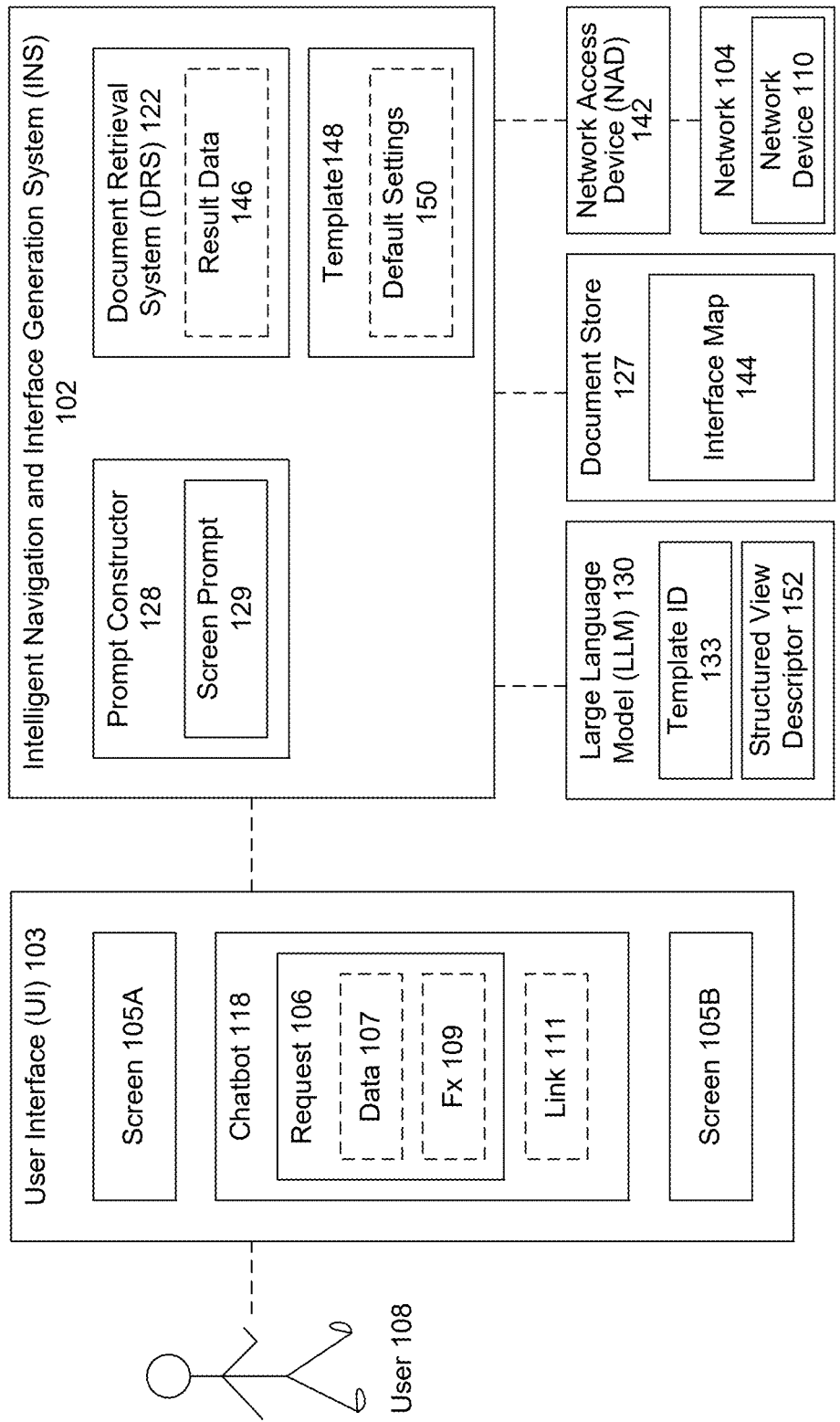
FIG. 1 is a block diagram illustrating example functionality for an intelligent navigation and interface generation system (INS), according to some embodiments.

FIG. 1 is a block diagram 100 illustrating example functionality for an intelligent navigation and interface generation system (INS) 102, according to some embodiments. INS 102 may provide a user 108 with shortcuts for navigating a user interface (UI) 103 and quickly and directly accessing any requested data 107 and/or functionality from any screen 105A, 105B of the UI 103. In some embodiments, INS 102 may update existing screens 105 of the UI 103 and/or generate new screens of the UI 103 responsive to a request 106 received from the user 108.

User interface (UI) 103 may include any application frontend, such as a graphical user interface. UI 103 may be the frontend of any computing application, app, or program. UI 103 may be displayed on the screen of a mobile device, laptop, tablet, or any other computing device. While the UI 103 may connect to any application backend and provide any data or functionality to the user 108, for simplicity, as described herein UI 103 may allow user 108 to access and modify data associated with the operations of a network 104. The user 108 may for example access and perform functionality that modifies data that modifies the operations of one or more network devices 110 (e.g., routers, servers, switches, end-user computing devices, etc.).

Network 104 may include any communications or telecommunications network that connects two or more network devices 110 across two or more locations, through which data (e.g., including voice, Internet, streaming, etc.) may be transmit between the various different computing devices, computing nodes, network elements, or locations.

In some embodiments, the actual data transmittal functionalities of network 104 may be performed by any number of interconnected network devices 110. In some embodiments, network 104 may include an optical network and the network devices 110 may include amplifiers, multiplexers/demultiplexers, add/drop multiplexers (ADMs), regenerators, and transponders, switches, routers, or other equipment that may comprise the optical network, whose operations are monitored and/or modified in accordance with a request 106. In some embodiments, the network devices 110 may include network devices from optical layer 1, layer 2, and/or layer 3 devices.

Each network device 110 may have its own configuration or specifications, including its own unique combination of vendor, generation, and layer. Vendor may be the name of a company, manufacturer, make of a network device 110. Some example vendors include, but are not limited to, Ciena, Fujitsu, Nokia, Google, and Cisco. Generation may indicate the model of a device, the firmware version, software version, year of production, or other technical features or aspects of the network device. Some example generations may include, but are not limited to, SONET (synchronous optical network), OTN (optical transport network), SDH (synchronous digital hierarchy), and DWDM (dense wavelength division multiplexing). Layer may indicate on which network layer the particular network device 110 operates.

In some embodiments, each unique combination of vendor, generation, and layer may include its own unique communications protocols, communications interface, or application programming interface (API) by which an NAD 142 may interact and communicate with the network device 110. For simplicity, only a single network device 110 is illustrated, however it is understood network 104 may include any number of network devices 110 across different vendors, generations, and layers. In some embodiments, NAD 142 may manage and coordinate the communications and interactions across these varied multi-vendor, multi-generational, multi-layer network devices 110 in retrieving data 107 and/or performing functionality 109 requested by the user 108 as part of request 106.

In some embodiments, NAD 142 may manage its own records or network database (not illustrated) regarding the status of network 104 and/or network devices 110. In some embodiments, NAD 142 may periodically receive or ping network 104 and/or network devices 110 for status updates, network configurations, network maps, or otherwise receive or generate data and/or documents related to the (real-time) operational characteristics of network 104 and/or one or more network devices 110. In some embodiments, this operational data may be stored in a network database accessible to NAD 142, which may be periodically updated by NAD 142. In some embodiments, INS 102 may send queries to NAD 142 if any real-time data or historical network information is required to needed to process request 106 or is to be displayed on UI 103.

UI 103 may provide an application frontend for accessing data 107 about and/or performing functionality (Fx) 109 related to modifying which data 107 is displayed in the UI 103 and/or impacting the operations of one or more network devices 110 across network 104. UI 103 may include various screens 105A, 105B (referred to herein generally as screen 105 or screens 105), each screen 105 being configured to display and provide access to some set of data 107 and/or functionality 109 related to the network 104. Each screen 105 may include any variation of user interface components (e.g., buttons, menus, tables, charts, texts, images, multimedia, etc.) with which the user 108 may interact to access the data 107 or functionality 109 and/or navigate between the various screens 105.

Conventionally, each screen 105 may be preconfigured to display a certain set of data 107 and/or functionality 109. Thus, if a first screen 105A does not include the data/functionality desired by the user 108, the user 108 would have to interact with different user interface components to navigate to a different screen to access whatever data and/or functionality is required by the user 108. For example, a user may select a menu option from screen 105A and that may load screen 105B. For simplicity, only two screens 105 are illustrated, but it is understood that UI 103 may include any number of screens 105.

In some embodiments, UI 103 may require the user 108 to navigate through multiple different screens 105 in order to reach their desired data or functionality, which consumes both time and uses unnecessary resources. Further, the ability of the user 108 to navigate the UI 103 requires the user 108 to already be familiar or become familiar through resource-consuming trial-and-error, with the various screens 105 of the UI 103 and what data and/or functionality is accessible from each screen 105. This navigation can be further complicated if the layout of any of the screens 105 of the UI 103 is updated or modified.

Rather than requiring the user 108 to manually navigate across the various screens 105 of UI 103 to access a desired screen 105, INS 102 may provide immediate and direct access to any data 107 and/or functionality 109 accessible from any screen 105 of the UI 103 from any other screen 105 of the UI 103. For example, if the user 108 is viewing screen 1, but their desired data or functionality is on screen 3, which requires navigation past screen 2, rather than requiring the user 108 to manually navigate from screen 1 to screen 2 to screen 3, INS 102 may provide direct access to screen 3 from screen 1 via a user interface component that may be accessible from any/all screens 105 of UI 103, such as a chatbot 118.

In some embodiments, chatbot 118 may provide a communications interface between INS 102 and a user 108. Chatbot 118 may include a computer program that is designed to simulate a conversation with a human user 108. Chatbot 118 may include any interface or interface component that enables a user 108 to access chatbot functionality or interact with another computing system, such as INS 102. In some embodiments, chatbot 118 may be accessible via the internet (e.g., through a website), a messaging application (including textual and/or audio communications), or any add-on messaging service that enables two-way communications. Chatbot 118 may allow user 108 to speak and/or type natural language input, which may be received as request 106. The natural language input by user 108 may include normal speaking/writing language (e.g., as opposed to requiring the user 108 to communicate through any particular communication protocols or programming language).

In some embodiments, chatbot 118 may be accessible to the user 108 from any screen 105 of the UI 103. So, rather than trying to figure out how to manually navigate the various screens 105 of UI 103 to perform some functionality and/or otherwise access data, the user 108 may simply provide a request 106 for data 107 and/or functionality 109 directly to chatbot 118. INS 102 may identify whatever screen 105 most closely corresponds to the request 106 based on an interface map 144, modify or customize an existing template 148 corresponding to the screen 105 (as needed per the request 106) to generate a structured view descriptor 152, and provide a direct link 111 to the new screen 105 to user 108. In some embodiments, the link 111 may be a hyperlink that directs the user 108 to a new screen 105 of the UI 103 generated based on the structured view descriptor 152 and responsive to the request 106. The user 108 can select the link 111 to view the new screen 105B generated based on the structured view descriptor 152 including the requested data 107 and/or functionality 109 (which may be performed on behalf of the user 108), rather than having to manually navigate the UI 103 and manually perform the functionality 109 themselves. INS 102 may provide a shortcut for navigating the UI 103, accessing data 107 and/or performing functionality 109.

In some embodiments, chatbot 118 may receive a request 106 from user 108. Request 106 may be any request from the user 108 to access data 107 or access/perform some functionality 109. In some embodiments, the data access request 107 may include any data-oriented request, including a request to read, access, or update a particular set of data. In some embodiments, the data access request 107 may include a request to view or access a particular screen 105 of the UI 103 (e.g., "show me the screen that has information about active devices").

In some embodiments, the functionality request 109 may include any request to access or perform some functionality accessible from any screen 105 of the UI 103. In some embodiments, the functionality request 109 may include a request to update the data 107. Updating the data may include copying data, modifying data, filtering data, adding new data, and/or deleting existing data. In some embodiments, the functionality request 109 may include a request to perform functionality that modifies the operations of one or more network devices 110. For example, the functionality request 109 may include a request to reserve a wavelength or bandwidth to transfer data from a first location to a second location using multiple different network devices 110. The functionality request 109 may be for any commands are accessible from any screen 105 (e.g., including through menu commands, buttons, or other user interface components) of UI 103, such as filtering which data is displayed on a screen 105. For example, rather than looking at all devices across all manufacturers, functionality request 109 may be for only for devices of manufacturer XYZ.

As used herein, the term request 106 may be used generally to refer to any request 106 (for data 107 and/or functionality 109) that may be received via chatbot 118. As an example, the request 106, as received from user 108, may be "Show me the alarms for devices from ABC located in Virginia." For simplicity, this request 106 for alarms data will be used as a primary example throughout this specification, however as noted other embodiments, may include any other types of requests 106 for screens 105, data 107, and/or functionality 109. For example, rather than just requesting to see the alarms, the request 106 may include a functionality clear an existing alarm. In some embodiments, request 109 may include a request to create a new alarm or delete/modify an existing alarm.

In some embodiments, alarms may be related to monitoring the utilization, performance, availability of one or more network devices 110 (e.g., routers, servers, switches, etc.). For example, an alarm may monitor one or more metrics regarding the utilization, performance, and/or availability of a particular network device 110, for when the one or more metrics drop below or rise above a related threshold value. When the threshold value is reached or exceeded, the alarm may provide an electronic notification to a user or system or perform some other action or activity (e.g., such as shutting down the network device 110).

In some embodiments, user 108 may login to UI 103, and INS 102 may provide an initial screen to the user 108, which may be screen 105A. In some embodiments, the initial screen 105A may include any screen from which request 106 is received. In some embodiments, the initial screen 105A may include a home screen that is presented to any authenticated user 108, or may include user-specific customizations.

Figure 2:
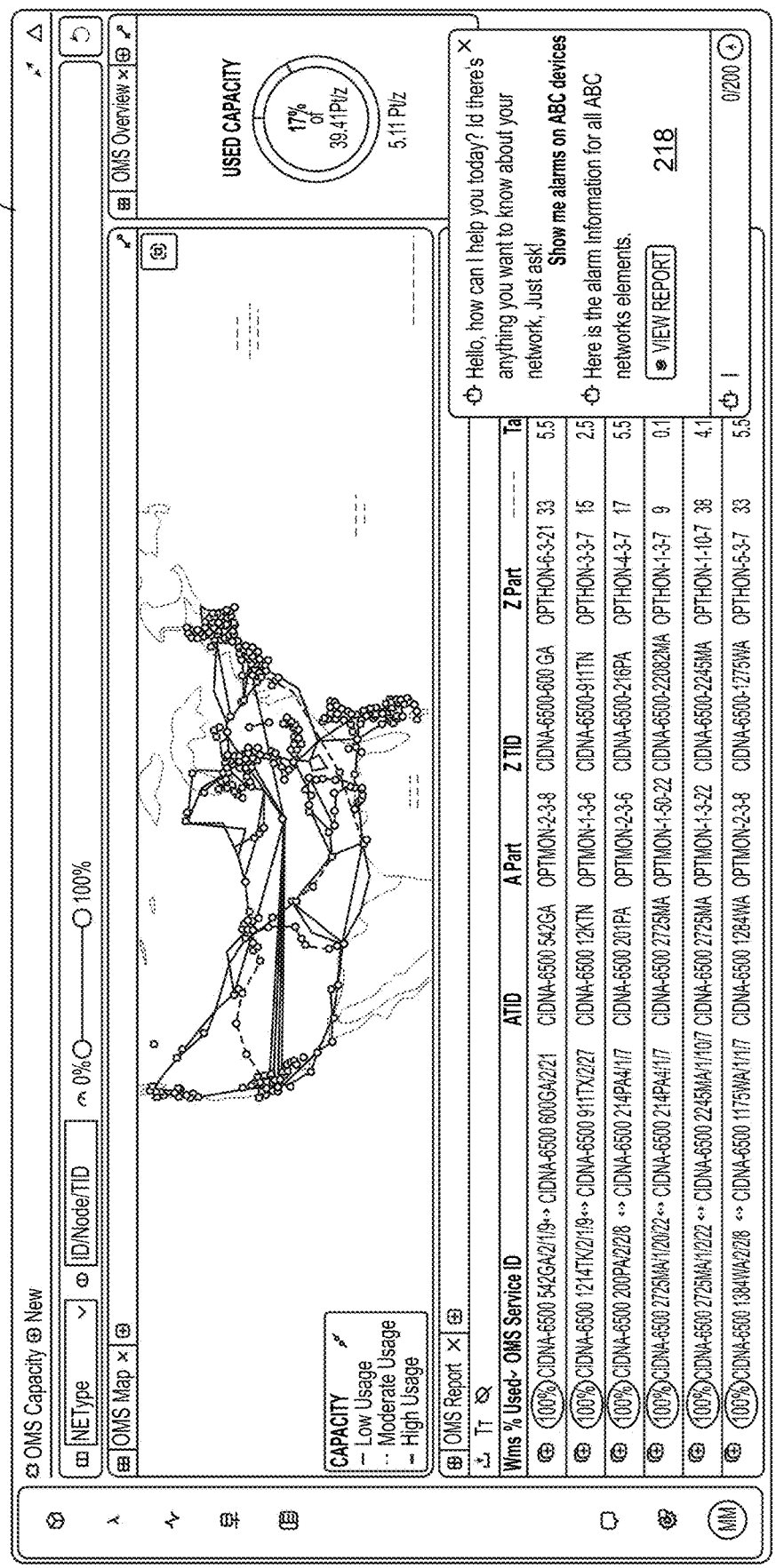
FIG. 2 illustrates an example initial screen of user interface which receives a request 106 from a user 108, according to some embodiments.

FIG. 2 illustrates an example initial screen 205A of user interface 103 which receives a request 106 from a user 108, according to some embodiments. The initial screen 205A is an example of an initial screen 105A as illustrated in FIG. 1. Initial screen 205A is just an example, and in other embodiments, the initial screen 205A may include any other data and/or functionality. Initial screen 205A may include a chatbot window 218 which may be an example of chatbot 118 as illustrated in FIG. 1.

In continuing the alarms request 106 example above, as illustrated, the initial screen 205A may include various information, but no information about alarms. Unable to find the information about alarms on initial screen 205A, user 108 may submit a request 106 for the alarms to chatbot 218. In other embodiments, the initial screen 205A may include the alarms information, but the user 108 may be unable to see where the alarms data is on the initial screen 205A, in which case user 108 may still submit a request 106 to chatbot 218.

Returning to FIG. 1, as noted above, the request 106 provided to the chatbot 118 may be "Show me the alarms for devices from ABC located in Virginia." In some embodiments, chatbot 118 may communicate the request 106 to INS 102. INS 102 may include or have access to a document retrieval system (DRS) 122. DRS 122 may identify any data associated with the request 106 from a document store 127. Document store 127 may include an interface map 144 that may be used to identify which screen 105 of the UI 103 corresponds to the request 106. In some embodiments, document store 127 may include additional documents beyond interface map 144 which may be parsed by DRS 122 in processing request 106.

In some embodiments, interface map 144 may include a blueprint of the UI 103, specifying how data is retrieved, displayed, and the flow between different screens 105. In some embodiments, interface map 144 may provide or define a layout or structure that indicates what data and functionality is available from each of the different screens 105 of the UI 103. In some embodiments, interface map 144 may indicate a navigational flow between the different screens 105 of UI 103 (e.g., which user interface elements load new or different screens 105).

In some embodiments, the interface map 144 may include a schema of the UI 103 for an underlying application, and may define the organization and relationships of data across the various screens 105 of the UI 103. In some embodiments, interface map 144 may include, provide, or correspond to a schema of a database (which may be stored in document store 127), including tables, fields, data types, and constraints. In some embodiments, interface map 144 may include a reference to a template 148 that is used to generate a particular screen 105 of the UI 103.

FIG. 3 illustrates an example of an interface map 344, according to some embodiments. The interface map 344 may be an example of interface map 144 from FIG. 1. In some embodiments, interface map 344 may text stored across one or more files, including any or all of the information described above.

As illustrated, interface map 344 describes various data and values that may be displayed on a particular screen 105 of the UI 103. For example, on the reports screen, there may be a wavelength portion with a description of what the wavelength is, tags indicating what words of in request 106 may be used to refer to the wavelength, components indicating what wavelength data is displayed, and filters may indicate filtering functionality that may be available by which to filter the wavelength data.

Returning to FIG. 1, because the request 106 is a natural language request (e.g., not in any particular computing code or computing language), the request 106 cannot be executed directly against the interface map 144 to identify a screen 105 of UI 103 related to the request 106. In some embodiments, INS 102 may utilize the capabilities of a large language model (LLM) 130 to parse the interface map 144 and identify one or more templates 148 corresponding to the request 106.

In some embodiments a prompt constructor 128 may build or construct one or more prompts for LLM 130 to perform some functionality, including generating some form of output in response to the prompt, related to request 106. A prompt may include one or more lines of text organized across one or more documents that is particularly formatted to by understandable by a large language model (LLM) 130.

LLM 130 may include a multimodal model that is able to accept as input and provide as output other types of data beyond natural language. For example, LLM 130 may accept images as input. For example, it may be useful to provide a screenshot to the model to provide additional context to support what the user is viewing. LLM 130 may include an artificial intelligence, machine learning, or deep learning model that is configured to execute data processing commands from plain-text (e.g., not requiring computer language or coded input). LLM 130 understand, generate, and manipulate human language. LLM 130 may be trained on vast amounts of text data. LLM 130 may use deep learning techniques—particularly transformer architectures—to recognize patterns in language and predict what comes next in a sequence of words. This allows it to perform a wide range of language-based tasks, such as answering questions, writing essays, summarizing text, translating languages, coding, and even engaging in conversation. LLM 130 may include any computing system that is configured to perform processing tasks based on text-based or plain language inputs. LLM 130 may be configured to create original content from one or more documents or input in accordance with a prompt. In some embodiments, LLM 130 may include a generative pre-training transformer (GPT). In some embodiments, LLM 130 may include a state space model (SSM) that describes how an internal state of a system evolves over time.

In some embodiments, the functionality described herein may be achieved through a single prompt or multiple prompts for LLM 130. However, for simplicity and clarity, as described herein, the utilization and functionality of LLM 130 will be described with regards to prompt constructor 128 constructing a screen prompt 129. In other embodiments, different or additional prompts may be constructed.

The screen prompt 129 may instruct the LLM 130 to generate a structured view descriptor 152. The structured view descriptor 152 may include one or more instructions to the UI 103 on how to generate a new screen 105B responsive to the request 106 received from the user 108. In some embodiments, the structured view descriptor 152 may include changes from an underlying template 148, which may be used to generate a default version of a screen requested with by the user 108. However, as indicated above, the request 106 may request data 107 and/or access to or the performance of functionality 109 beyond the default version of the screen. LLM 130 may capture these changes in a format understandable or executable by the UI 103 in a structured view descriptor 152 format, file, or document.

In some embodiments, DRS 122 may retrieve and provide the interface map 144 (or portions thereof) as part of the input with screen prompt 129. In some embodiments, DRS 122 may perform a vector search on interface map 144, based on request 106, and identify one or more portions of the interface map 144 that are relevant to request 106. In some embodiments, these one or more portions of the interface map 144 may then be provided to LLM 130 for processing, in lieu of providing the entire interface map 144. In some embodiments, prompt constructor 128 may copy or extract the text of the interface map 144, or an identified relevant portion thereof, and include the text within the screen prompt 129.

LLM 130, in executing screen prompt 129, may identify a template ID 133 of a template 148 associated with the request 106. For example LLM 130 may compare the context and wording of request 106 to the context and wording of interface map 144 (or provided portions thereof), and identify the template ID 133 of a template 148 corresponding to the request 106. Template ID 133 may include any alphanumeric or symbolic identifier corresponding to a template 148, which is used to generate a screen 105 or screen portion of UI 103. In some embodiments, each different portion of the interface map 144 may include a template ID 133 for that portion. In some embodiments, each different template ID 133 may correspond to a different template 148 which is used to generate a different screen 105 of the UI 103.

For simplicity, only a single template 148 is illustrated, however it is understood that there may be any number of templates 148, each corresponding to a different screen 105 or portion of a screen 105 of UI 103, each with its own unique template ID 133. In some embodiments, in executing screen prompt 129, LLM 130 may identify multiple template IDs 133, each of which corresponds to a different template 148 associated with at least a portion of request 106.

In some embodiments, the interface map 144 may describe what data and/or functionality is available from each screen 105 (and/or underlying template 148) of the user interface 103. Based on comparing request 106 (which may be provided with screen prompt 129) to this description in interface map 144, LLM 130 may identify the most relevant or corresponding template ID 133 and/or template 148. In some embodiments, interface map 144 may include the text or content of the various templates 148.

As an example, a portion of the interface map 144 may include a description of an alarms screen, and provide the data structures and functionality (e.g., filters) that may be available from the alarms screens, and may also include a template ID 133, corresponding to a particular alarms screen template 148.

In some embodiments, the screens 105 of the UI 103 may each be generated based on a template 148. Template 148 may include a pre-designed structure or framework for screen 105 that provides a foundation for building or generating a screen 105 or a set of screens 105. In some embodiments, the template 148 may be understandable or executable by the UI 103, which may be part of an app, application, browser, or other computing service.

In some embodiments, template 148 may include default settings 150. The default settings 150 may provide a starting point with a pre-set layout, design elements, user interface elements, and preconfigured data 107 and/or functionality 109 (as corresponding to interface map 144) accessible to the user 108 from a screen 105 built from a template 148. In some embodiments, these default settings 150 and any other contents of template 148 may be described in interface map 144 in a manner understandable by LLM 130. In some embodiments, template 148 may include a general layout, color scheme, and user interface elements that may be displayed on a particular screen 105. Template 148 may streamline the screen creation, modification, update, or building process and may allow INS 102 to configure and create screens 105 for user 108 based on the request 106 by modifying one or more pre-existing templates 148. In some embodiments, default settings 150 may include default data and/or default functionality available from the template 148.

For simplicity, only a single template 148 is illustrated, however it is understood that template 148 may include any number of templates 148. In some embodiments, each template 148 may correspond to a different screen 105 of UI 103, or multiple screens 105 may share the same base template 148. In some embodiments, template 148 may include a default template with default settings 150 for any new or custom screens or dashboards that may be created based on a request 106.

As noted above, INS 102 provides the user 108 with a way to shortcut past conventional user interface navigation by providing a request 106 to chatbot 118. In these instances, INS 102 may utilize LLM 130 to modify the default settings 150 of template 148 to generate a structured view descriptor 152 based on request 106. The structured view descriptor 152 may include a different appearance, structure, and/or settings relative to the underlying template(s) 148. In some embodiments, a user request 106 to see a particular screen 105 of the UI (e.g., "show me the alarms screen") without any additional data request 107 or functionality request 109, may cause the LLM 130 to include the template ID 133 of the alarms screen template 148 in the structured view descriptor 152. Based on this structured view descriptor 152, UI 103 may generate the new screen 105B generated from the default settings 150 of template 148. If there were any modifications or changes to the screen 105B requested by user 108, as included in request 106, these modifications would be included as new instructions in the structured view descriptor 152 that is submitted to the UI 103 to generate the new screen 105B.

As noted above, screen prompt 129 may instruct or otherwise cause LLM 130 to modify the default settings 150 of a template 148 in accordance with request 106. For example, add new instructions to a structured view descriptor 152, which may be used to override any conflicting default settings 150 from the underlying template 148, in accordance with request 106. For example, default settings 150 may indicate that the data should include data for devices for all manufacturers, however the structured view descriptor 152 may indicate to only include data for devices of manufacturer XYZ. Receiving this structured view descriptor 152, UI 103 may initially load the underlying template 148 and default settings 150, but instead of retrieving and displaying all of the data across all manufacturers into the new screen 105B, UI 103 may only load the data for devices of manufacturer XYZ. In some embodiments, LLM 130 may generate and include a query in the structured view descriptor 152 that can be executed against a database to retrieve only the data for devices of manufacturer XYZ, in accordance with request 106.

In some embodiments, the screen prompt 129 may include natural language instructions for the LLM 130 to:
  i) act as an intelligent language virtual assistant to provide support for optical network requests,
  ii) choose 1-4 template identifiers of the interface map for which the corresponding templates are most likely to contain the data and/or functionality requested by a user or otherwise indicate if no templates are likely to contain the data and/or functionality requested by the user
  iii) generate any modifications that are to be made to the template(s), corresponding to the chosen template identifier(s), to align them more closely with the request
  iv) generate a JSON file including both template IDs for the chosen template identifier(s) and the modification(s) to the underlying template(s)
  v) provide the JSON file to the UI.

In some embodiments, the structured view descriptor 152 may reference or include data, functionality, and/or user interface elements from multiple different templates 148 (if multiple template IDs 133 were returned) which are combined together into a structured view descriptor 152 responsive to the request 106. For example, the default settings 150 may indicate that the alarms screen (corresponding to the template 148) does not include functionality to acknowledge an alarm, but the acknowledge alarm functionality may be accessible from a different screen 105 corresponding to a different template 148. Because the request 106 may include a request such as "show me the active alarms, so I can acknowledge one," LLM 130 may combine features from the two different template 148 to generate a structured view descriptor 152 that includes the alarms data from a first template 148 combined with the acknowledge functionality from a second template 148.

As noted above, DRS 122 may be configured to find or identify a document or portion of a document that is related to a request 106. In some embodiments, DRS 122 may execute a query against a vector database (not shown) in the document store 127, to identify a portion of the interface map 144 corresponding to the request 106. From this portion or these portions of the interface map 144, LLM 130 may identify a template 148 and any related filters or functionality, generate a structured view descriptor 152, and send a response with the structured view descriptor 152 to the UI 103. In some embodiments, the structured view descriptor 152 may include the template ID 133 and one or more instructions that indicate any modifications to deviations from the default settings 150 of the underlying template 148. UI 103 may generate a new screen 105B corresponding to the structured view descriptor 152 to be provided to the user 108. In some embodiments, the address of this new screen 105 may be provided to chatbot 118, which may make the new screen 105B accessible to the user 108 via a link 111.

For example, if request 106 asks for "wavelengths with 20% used capacity or less", the LLM 130 may identify a portion of interface map 144 related to wavelengths. From the interface map 144, a 'wavelength' template ID 133 may be identified. UI 103 may have access to the underlying template 148 for the 'wavelength' template ID 133. LLM 130 may generate a structured view descriptor 152, including a reference to the 'wavelength' template ID 133 and any instructions to modify the data to be displayed limiting it to wavelengths with 20% used capacity or less, as indicated by the request 106.

LLM 130 may provide this structured view descriptor 152 to the UI 103 to generate a new screen 105B in response to request 106. In some embodiments, the structured view descriptor 152 may be or include data organized in a structured format, such as a JSON file. An example structured view descriptor 152 is illustrated below:

report_selection: "wavelength"
report_specification:
{used_percentage: "{"lower": 0, "upper": 0.2}"}
used_percentage; "{\"lower\"; 0, \"upper\": 0.2}"
tab_name: "Underutilized Wavelengths"

As illustrated above, the UI 130 may begin with the template 148 for 'wavelength' and implement the changes (to the default settings 150) as provided in the structured view descriptor 152. Which may include different functionality and/or data. In some embodiments, the interface map 144 and/or template 148 may indicate that additional data is to be retrieved from document store 127 and/or NAD 142. If so, then as part of constructing the structured view descriptor 152, DRS 122 may retrieve this result data 146 from document store 127 and/or NAD 142, which is then included in the structured view descriptor 152 (e.g., JSON file). Result data 146 may include whatever data was identified from the document store 127 and/or NAD 142 to be displayed as part of new screen 105.

In some embodiments, the INS 102 may provide the structured view descriptor 152 in an executable format or may generate a new screen 105B (viewable from UI 103) based on the custom template 152 (which may include the result data 146). As noted above, in some embodiments, INS 102 may generate a link 111 to this new screen 105B. The link 111 may be displayed in chatbot 118 responsive to the request 106 and the user 108 may be prompted to click or open the link 111. Upon a selection of the link 111, the new screen 105B may be displayed as part of the UI 103.

In some embodiments, the new screen 105B may replace the initial screen 105A, in the UI 103, with navigational access (forward and backward) provided between the new screen 105B and the initial screen 105A. However, the conversation with chatbot 118 may be persisted from the initial screen to the new screen 105B, such that the user 108 may see, access, and continue the conversation through chatbot 118 from the new screen 105B. In some embodiments, the new screen 105B may be displayed in a new independent window or tab of UI 103 (with chatbot 118 accessible from both screens 105A and 105B).

Figure 4A:
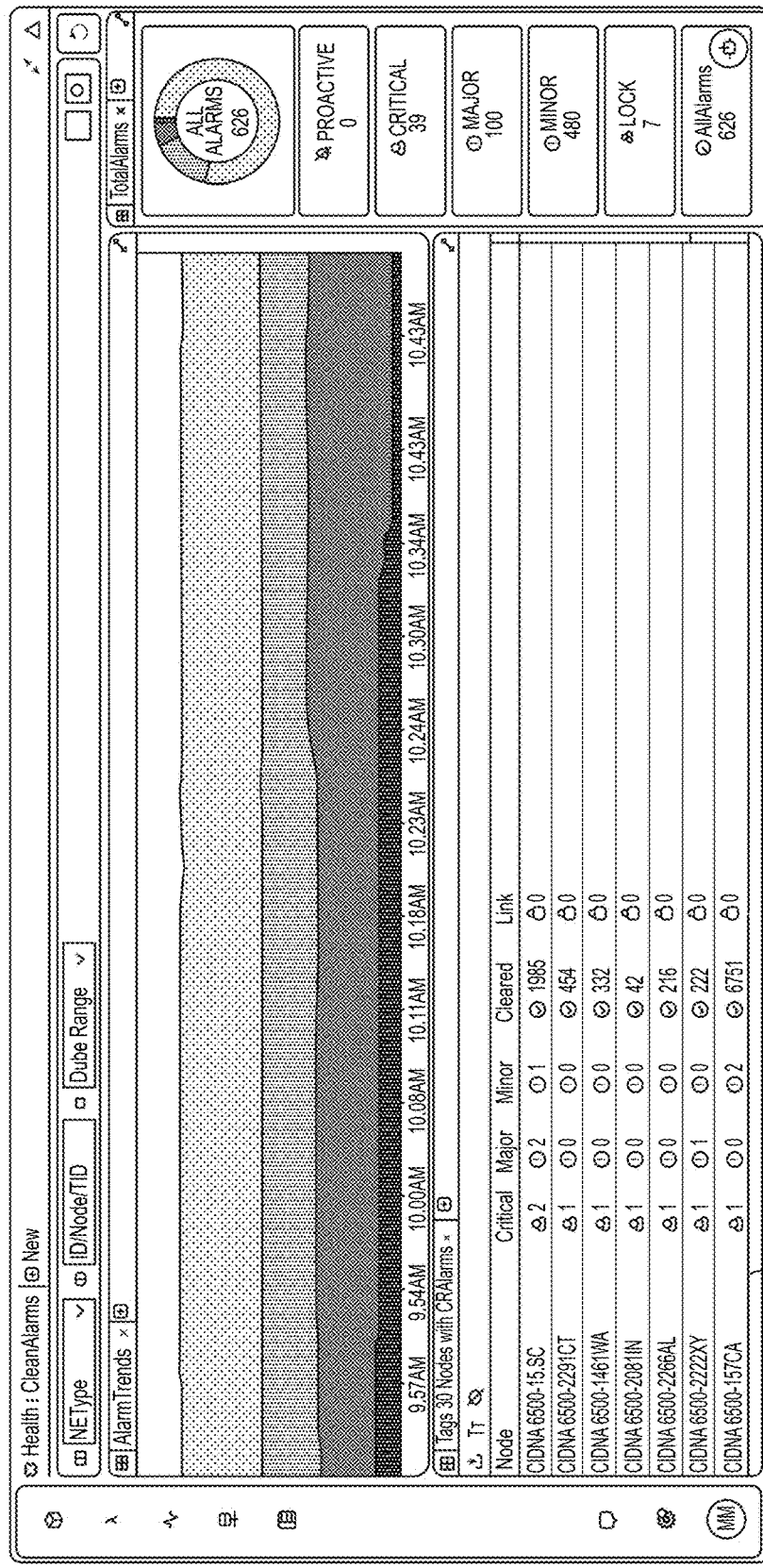
FIGS. 4A and 4B illustrate examples of screens of the user interface which are generated based on a default template and custom template, respectively, according to some embodiments.
Figure 4B:
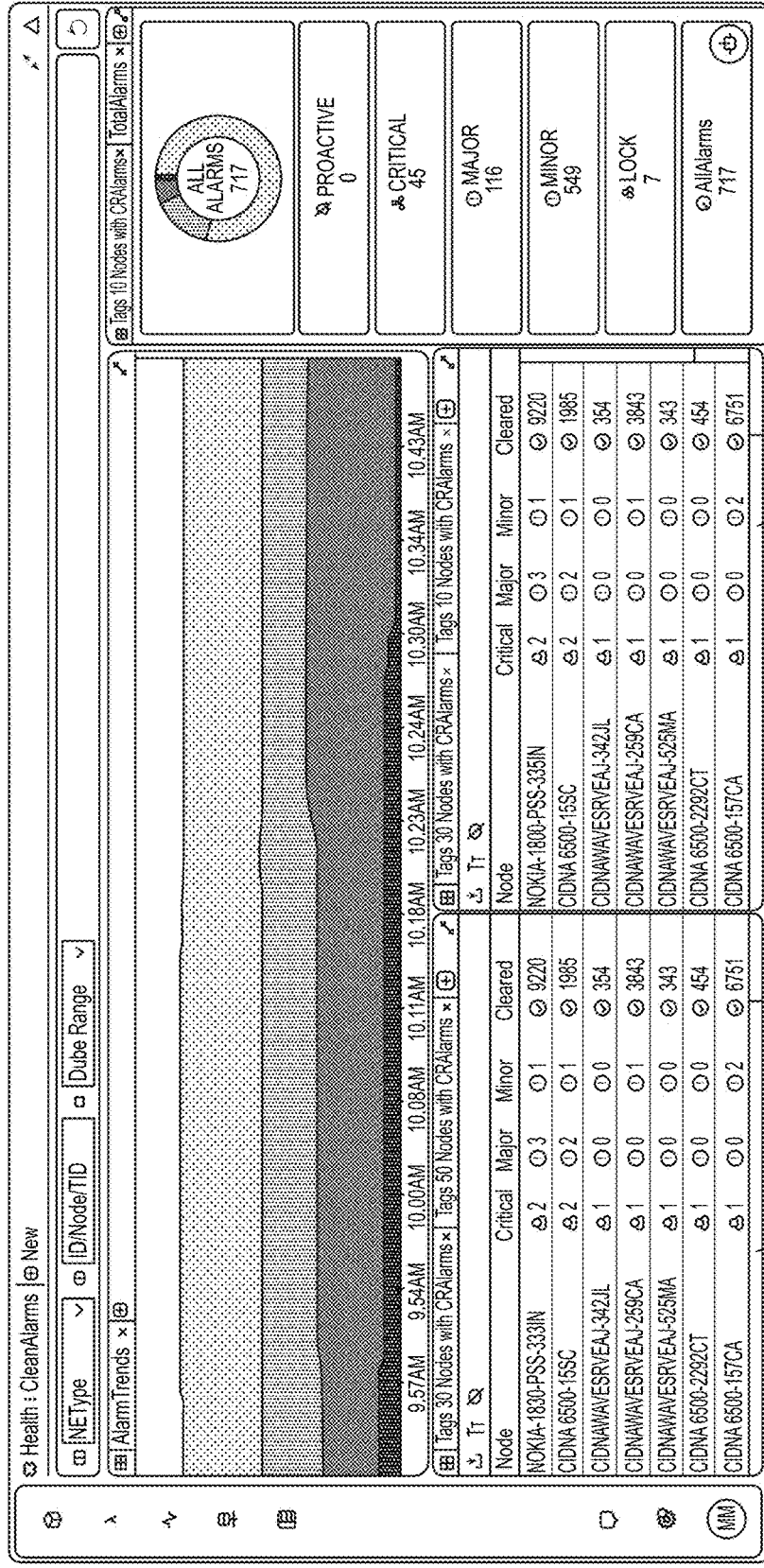

FIGS. 4A and 4B illustrate examples of screens 401, 402 of the user interface 103 which are generated based on a default template 150 and custom template 152, respectively, according to some embodiments. Screens 401 and 402 are example embodiments of screens 105A and 105B from FIG. 1.

FIG. 4A illustrates an example default version of a screen 401 generated from a default template 148. The screen 401 may include data portions 407 and 405C. Upon receiving a request 106 from a user 108, INS 102 may generate a new screen 402 based on a structured view descriptor 152 which may be a variation of the default template 148 (used for screen 401), but as modified in accordance with request 106. As illustrated FIG. 4B may include data portion 405C which is identical to FIG. 4A, and may include a new data portions 405A and 405B different from FIG. 4A.

Returning to FIG. 1, in some embodiments, if there is no one screen or template 148 that includes everything that is requested by the user 108 in request 106, then LLM 130 may generate structured view descriptor 152 by combining features from multiple different templates 148. The new, custom, or structured view descriptor 152 may indicate which data and/or functionality from which templates 148 is being combined together.

In some embodiments, INS 102 may track a usage history of a user 108. And if the user 108 provides the same or similar request 106 multiple times, INS 102 may prompt user 108 whether they want this request 106 to be saved an automatically executed for the user 108. For example, if the user 108 requests to see the alarms screen multiple times, then INS 102 may ask the user 108 if the user 108 wants the alarms screen to be automatically generated for the user 108 without the receiving a new request from the user 108. If the user 108 answers affirmatively, INS 102 may provide the user 108 with the option to schedule when the alarms screen is to be generated or the user 108 (e.g., upon each login, daily, weekly, at a specific day/time, etc.).

The conventional process of requiring the user 108 to understand the layout and navigate the various screens 105 of a UI 103 to find whatever they are looking for is both time and resource consuming, requiring the loading of any intermediary screens and data values which may be unnecessary for the user and also requiring the user to know where to navigate in order to identify the filter functionality for the wavelengths. This process is further complicated when the user interface 103 is updated.

INS 102 provides a simpler, less resource consuming and less time consuming way for the user 108 to request the same in formation or even more customized information. For example, chatbot 118 may be accessible from every screen 105 of UI 103. Rather than trying to navigate the screens 105 of UI 103 to try and find what they are looking for, the user 108 may simply provide a request 106 directly to chatbot 118 in plain language, such as "show me wavelengths where the usage is 20% or less".

In some embodiments, if the user 108 was to interact with the UI 103 through conventional navigation, the user 108 would navigate to the reports screen, select wavelength, and provide a filter value for the usage (such as "20%") through the reports screen 105. This may cause a filter command to be executed, to identify the wavelengths corresponding to the usage value of 20%. The result would then be provided back to the UI 103 which would update the reports screen 105 with the filtered values.

As described herein, INS 102 may shortcut this process by allowing the user 108 to simply submit a request 106 through chatbot 118, instead of manually navigating and searching different screens 105 of the UI 103. LLM 130 may be able to parse interface map 144, identify the reports screen template ID 133, and underlying template 148 where wavelength data is configured to be displayed, and identify the filter "used_percentage" that is to be used to filter the wavelengths data (or the default wavelengths data that is displayed on the reports screen 105 as defined by a default setting 150). In some embodiments, from template 148 and request 106, LLM 130 may be able to generate the structured view descriptor 152 for the UI 103 to display for the user 108 including the filtered wavelengths data.

Figure 5:
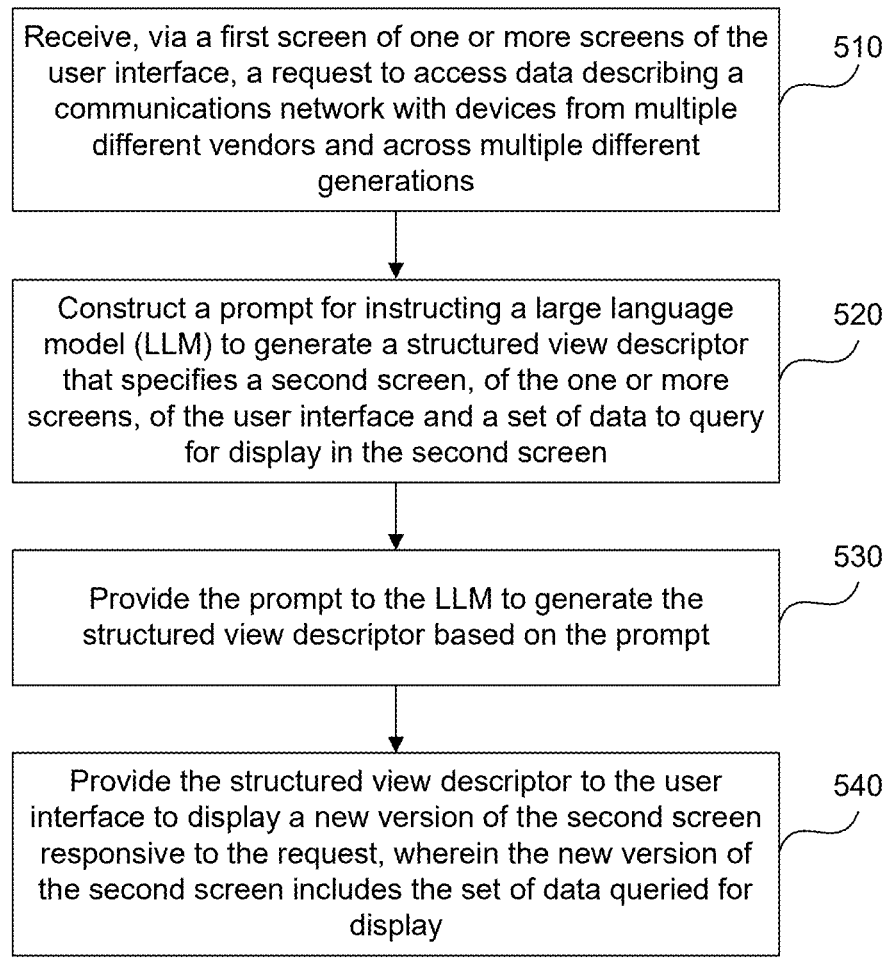
FIG. 5 is a flowchart illustrating example operations for providing by an intelligent navigation and interface generation system (INS), according to some embodiments.

FIG. 5 is a flowchart 500 illustrating example operations for providing by an intelligent navigation and interface generation system (INS) 102, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 1.

In 510, a request is received, via a first screen of one or more screens of a user interface, to access data describing a communications network with devices from multiple different vendors and across multiple different generations from a first screen of a user interface. For example, INS 102 may receive a request 106 to access particular data 107 of a network 104. The network 104 may include any number of network devices 110 which provide and/or transmit data to and/or across the communications across the network 104 from device (e.g., one end user device or network device 110) to another device. The network devices 110 may include devices from different vendors or manufacturers, device across different generations or models or manufacturing years, and devices operable across different layers of the communications network 104. The request 106 may be received via a chatbot 118 while user 108 is viewing a first screen or an initial screen 105A of the UI 103.

In 520, a prompt for instructing a large language model (LLM) to generate a structured view descriptor that specifies a second screen, of the one or more screens, of the user interface and a set of data to query for display in the second screen is constructed. For example, prompt constructor 128 may construct a screen prompt 129 instructing LLM 130 to generate a structured view descriptor 152 that specifies a second screen 105 of the UI 103 and a set of data to query for display in the second screen. For example, the structured view descriptor 152 may include a template ID 133 corresponding to a template 148 with instructions for generating a second screen 105 of the UI 103. The structured view descriptor 152 may also include one or more additional instructions for rendering the second screen 105 of the UI 103. For example, the additional instructions of the structured view descriptor 152 may include a query for the data to be displayed on the second screen 105, if the requested data 107 is different from the default data as indicated in the default settings 150. In some embodiments, this query may be provided to DRS 122 to execute against document store 127 (which may include a database or other queryable documents) and/or provided to NAD 142 which may return real-time network data about network 104 and/or one or more network devices 110.

In some embodiments, the screen prompt 129 may include at least a portion of the interface map 144, which may describe the default data and default functionality accessible from each screen 105 of the UI 103 (which may be codified in default settings 150). In some embodiments, screen prompt 129 may also include the request 106. In some embodiments, LLM 130 may compare the request 106 to the interface map 144 (or portions thereof) and identify a template ID 133 (corresponding to an underlying or associate template 148), where the description in the interface map 144 most corresponds to request 106.

In some embodiments, the template 148 may include a schema or orientation of the screen 105 and may be used to generate the visual elements of the screen 105 within the UI 103. In some embodiments, the template 148 may be executable or may be formatted to be executable by a browser, app, or other computer program to visually generate and provide a screen 105 for display. In some embodiments, each template 148 may have its own default settings 150 indicating what default data and/or functionality is to be displayed in a corresponding screen 105, and how the data and/or functionality is displayed on the screen 105, including where the data and functionality is located or arranged on the screen 105.

In 530, the prompt is provided to the LLM to generate the structured view descriptor based on the prompt. For example, INS 102 may provide the screen prompt 129 to LLM 130 to execute on and generate structured view descriptor 152. In some embodiments, LLM 130 may generate a structured view descriptor 152 that includes the template ID 133 corresponding to the template 148, and instructions, which may include a query to be executed for the data to be displayed on a new screen 105B of the UI 103. The instructions of structured view descriptor 152, as generated by LLM 130, may modify the default settings 150 of template 148 based on the request 106, corresponding to the data 107 and/or functionality 109 included in the request 106. In some embodiments, the structured view descriptor 152 may include a query for a subset of the default data (that is part of default settings 150), which has been filtered in accordance with the request 106. In some embodiments, the structured view descriptor 152 may include queries or requests for new or real-time data to be submitted to and queried from NAD 142 by DRS 122. In some embodiments, structured view descriptor 152 may be shared with and used by other users of UI 103.

In 540, the structured view descriptor is provided to the user interface to display a new version of the second screen responsive to the request. For example, LLM 130 may provide structured view descriptor 152 directly to UI 103, or to INS 102 which provides the structured view descriptor 152 to UI 103. Based on structured view descriptor 152, UI 103 has all the information (and queries) necessary to generate a new screen 105B corresponding to the request 106. In some embodiments, the UI 103 may import data from template 148 based on the template ID 133 included in the structured view descriptor 152, and modify portions of the screen to be displayed based, such as data, based on the instructions included in structured view descriptor 152. In some embodiments, structured view descriptor 152 may include a query for the data to be displayed in the new screen 105B. This query may be provided to and executed by DRS 122 and the data to be displayed in the new screen 105B may be returned to the UI 103.

In some embodiments, the new screen 105B may be automatically displayed in UI 103 upon receipt of the new data. In some embodiments, rather than automatically displaying the new screen 105B, INS 102 may generate a link 111 to the new screen 105B, and provide the link 111 to the user 108 via the chatbot 118. The user 108 may then select the link 111 from the chatbot 118 to view and interact with the second screen 105B.

In some embodiments, the user 108 may submit another request 106 to chatbot 118 requesting a further modification to the new screen 105B. For example, the original request 106 may have requested alarms for all devices located in Virginia (which is displayed in the new screen 105B as generated by INS 102 in response to the original request 106). However, the user 108 may now request alarms for only devices from XYZ manufacturer located in Virginia through a new request 106 provided to chatbot 118.

In some embodiments, INS 102 may follow a similar process as described above in processing this new request 106. However, rather than using the original default template 148 (as used for the original request 106), for this new request 106 INS 102 may include a new template ID 133 corresponding to the previously generated structured view descriptor 152 (which may have been saved and assigned its own new template ID 133), which may be further modified in accordance with the new request 106.

In other embodiments, INS 102 may start the generation of a new screen 105 for the new request 106 from the original default template 148 as described above. However, the request 106 processed by INS 102 may include elements of both the original request 106 and the new request 106, both of which accessible through a chatbot history or log.

Figure 6:
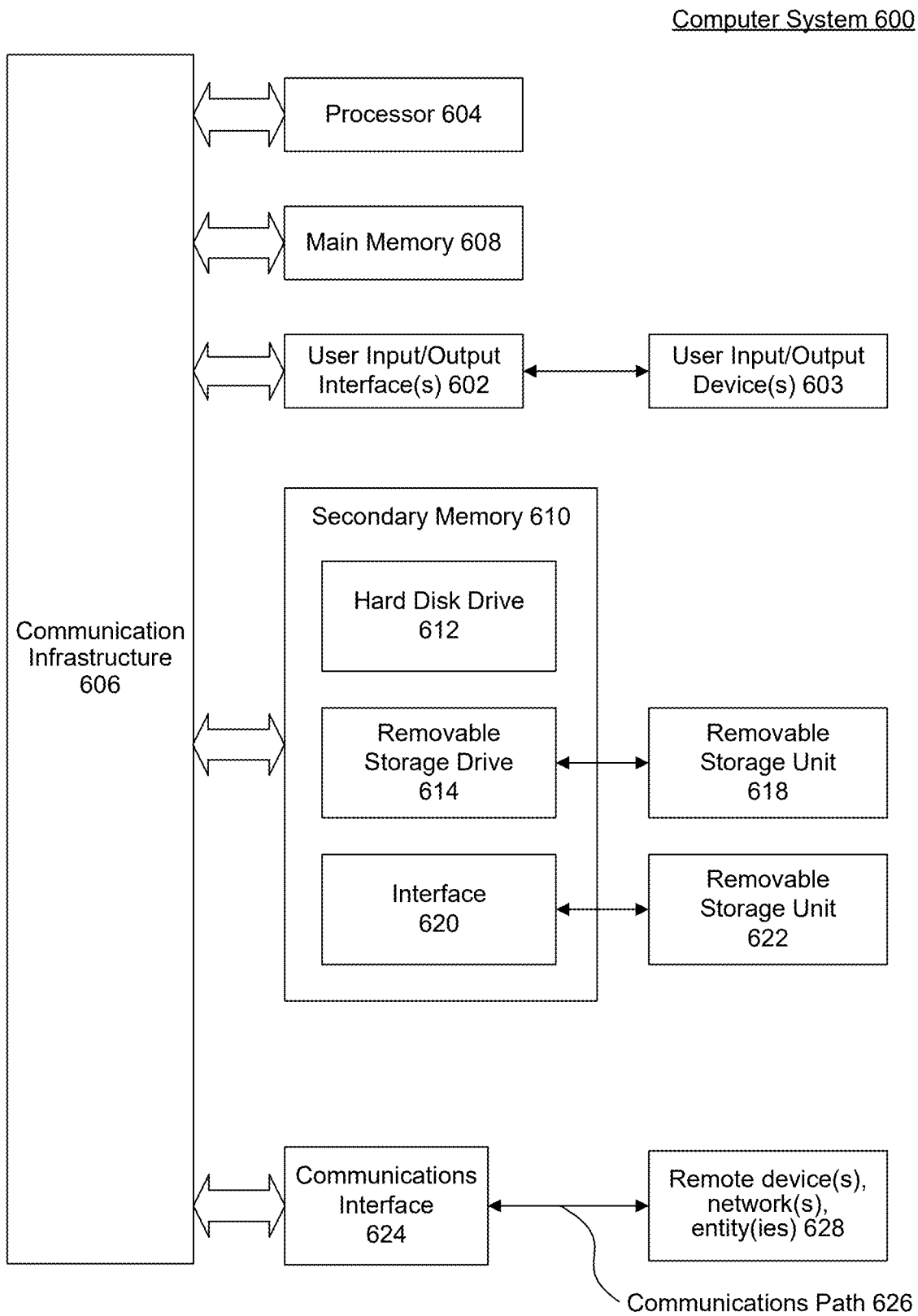
FIG. 6 is example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to LLMs, computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for intelligently navigating a user interface, comprising:
    receiving, via a first screen of a plurality of screens of the user interface, a request to access data describing a communications network with devices from multiple different vendors and across multiple different generations;
    constructing a prompt for instructing a large language model (LLM) to generate a structured view descriptor that specifies a second screen of the plurality of screens, of the user interface and a set of data to query for display in the second screen, the prompt comprising: (i) at least a portion of an interface map that indicates default data and default functionality is accessible from each of the plurality of screens of the user interface, and (ii) the request to access data;
    providing the prompt to the LLM to generate the structured view descriptor based on the prompt; and
    providing the structured view descriptor to the user interface to display a new version of the second screen responsive to the request, wherein the user interface is configured to display the new version of the second screen based on the structured view descriptor, wherein the new version of the second screen includes the set of data queried for display.

2. The computer-implemented method of claim 1, wherein the request is received via a chatbot accessible from the first screen.

3. The computer-implemented method of claim 2, wherein the providing comprises:
    providing a link to the new version of the second screen via the chatbot; and
    providing the new version of the second screen for display upon receiving a selection of the link, wherein the chatbot is also accessible via the new version of the second screen.

4. The computer-implemented method of claim 1, wherein the request to access data comprises a filter operation to be performed on the default data, wherein the filter operation is part of the default functionality included in a default template corresponding to the second screen.

5. The computer-implemented method of claim 1, wherein the structured view descriptor identifies both a first template and a second template associated with the request, and wherein the new version of the second screen includes one or more features from each of the first template and the second template.

6. The computer-implemented method of claim 1, wherein the structured view descriptor comprises a JavaScript Object Notation (JSON) file.

7. The computer-implemented method of claim 1, further comprising:
    performing a vector search that identifies the portion of the interface map associated with the request, wherein the portion of the interface map is submitted with the prompt to the LLM and wherein the portion of the interface map is used by the LLM to identify the second screen associated with the request to access data.

8. The computer-implemented method of claim 1, wherein the prompt comprises natural language instructions for the LLM to act as an intelligent language virtual assistant to provide support for optical network requests, choose one or more template IDs from the interface map corresponding to the request, and generate one or more modifications to a template corresponding to the one or more template IDs.

9. A system comprising:
    a memory; and
    at least one processor coupled to the memory and configured to perform operations comprising:
        receiving, via a first screen of a plurality of screens of a user interface, a request to access data describing a communications network with devices from multiple different vendors and across multiple different generations;

constructing a prompt for instructing a large language model (LLM) to generate a structured view descriptor that specifies a second screen of the plurality of screens, of the user interface and a set of data to query for display in the second screen, the prompt comprising: (i) at least a portion of an interface map that indicates default data and default functionality is accessible from each of the plurality of screens of the user interface, and (ii) the request to access data;
   providing the prompt to the LLM to generate the structured view descriptor based on the prompt; and
   providing the structured view descriptor to the user interface to display a new version of the second screen responsive to the request, wherein the user interface is configured to display the new version of the second screen based on the structured view descriptor, wherein the new version of the second screen includes the set of data queried for display.

10. The system of claim 9, wherein the request is received via a chatbot accessible from the first screen.

11. The system of claim 10, wherein the providing comprises:
   providing a link to the new version of the second screen via the chatbot; and
   providing the new version of the second screen for display upon receiving a selection of the link, wherein the chatbot is also accessible via the new version of the second screen.

12. The system of claim 9, wherein the request to access data comprises a filter operation to be performed on the default data, wherein the filter operation is part of the default functionality included in a default template corresponding to the second screen.

13. The system of claim 9, wherein the structured view descriptor identifies both a first template and a second template associated with the request, wherein the new version of the second screen includes one or more features from each of the first template and the second template.

14. The system of claim 9, wherein the structured view descriptor comprises a Javascript Object Notation (JSON) file.

15. The system of claim 9, the operations further comprising:
   performing a vector search that identifies the portion of the interface map associated with the request, wherein the portion of the interface map is submitted with the prompt to the LLM and wherein the portion of the interface map is used by the LLM to identify the second screen associated with the request to access data.

16. The system of claim 9, wherein the prompt comprises natural language instructions for the LLM to act as an intelligent language virtual assistant to provide support for optical network requests, choose one or more template IDs from the interface map corresponding to the request, and generate one or more modifications to a template corresponding to the one or more template IDs.

17. A non-transitory computer-readable medium having instructions stored thereon that, when executed by at least one computing device, cause the at least one computing device to perform operations comprising:
   receiving, via a first screen of a plurality of screens of a user interface, a request to access data describing a communications network with devices from multiple different vendors and across multiple different generations;
   constructing a prompt for instructing a large language model (LLM) to generate a structured view descriptor that specifies a second screen of the plurality of screens, of the user interface and a set of data to query for display in the second screen, the prompt comprising: (i) at least a portion of an interface map that indicates default data and default functionality is accessible from each of the plurality of screens of the user interface, and (ii) the request to access data;
      providing the prompt to the LLM to generate the structured view descriptor based on the prompt; and
      providing the structured view descriptor to the user interface to display a new version of the second screen responsive to the request, wherein the user interface is configured to display the new version of the second screen based on the structured view descriptor, wherein the new version of the second screen includes the set of data queried for display.

18. The non-transitory computer-readable medium of claim 17, wherein the request is received via a chatbot accessible from the first screen.

19. The non-transitory computer-readable medium of claim 18, wherein the providing comprises:
   providing a link to the new version of the second screen via the chatbot; and
   providing the new version of the second screen for display upon receiving a selection of the link, wherein the chatbot is also accessible via the new version of the second screen.

20. The non-transitory computer-readable medium of claim 17, wherein the request to access data comprises a filter operation to be performed on the default data, and wherein the filter operation is part of the default functionality included in a default template corresponding to the second screen.

* * * * *